United States Patent
Alvarez Lopez et al.

(10) Patent No.: US 11,208,049 B2
(45) Date of Patent: Dec. 28, 2021

(54) SNAP ROD LOCKER

(71) Applicant: GM Global Technology Operations LLC, Detroit, MI (US)

(72) Inventors: Andres Omar Alvarez Lopez, Toluca (MX); Uriel Torres Davalos, Toluca (MX)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 382 days.

(21) Appl. No.: 16/270,258

(22) Filed: Feb. 7, 2019

(65) Prior Publication Data

US 2020/0256100 A1    Aug. 13, 2020

(51) Int. Cl.
| | |
|---|---|
| *B60R 7/04* | (2006.01) |
| *E05D 7/10* | (2006.01) |
| *E05D 5/02* | (2006.01) |
| *B60R 7/02* | (2006.01) |
| *B60R 9/06* | (2006.01) |
| *E05D 1/04* | (2006.01) |
| *B60R 7/06* | (2006.01) |

(52) U.S. Cl.
CPC .............. *B60R 7/04* (2013.01); *B60R 7/02* (2013.01); *B60R 7/043* (2013.01); *B60R 7/046* (2013.01); *B60R 7/06* (2013.01); *B60R 9/06* (2013.01); *E05D 1/04* (2013.01); *E05D 5/0207* (2013.01); *E05D 7/1077* (2013.01); *E05Y 2900/538* (2013.01); *E05Y 2900/548* (2013.01)

(58) Field of Classification Search
CPC ......... Y10T 16/53607; Y10T 16/53613; Y10T 16/5362; E05D 7/1061; E05D 7/1066; E05D 7/1077; E05D 7/127; E05D 7/128
USPC ........................................................ 296/37.8
See application file for complete search history.

(56) References Cited

U.S. PATENT DOCUMENTS

| | | | |
|---|---|---|---|
| 10,590,687 B1 * | 3/2020 | Cifers ................... | E05D 7/1061 |
| 2003/0038142 A1 * | 2/2003 | Gee ...................... | A45C 13/005 |
| | | | 220/835 |
| 2014/0069949 A1 * | 3/2014 | Niemann .............. | E05D 7/1061 |
| | | | 220/840 |

FOREIGN PATENT DOCUMENTS

EP            1524752        * 10/2003

* cited by examiner

*Primary Examiner* — Dennis H Pedder
(74) *Attorney, Agent, or Firm* — Vivacqua Crane PLLC

(57) ABSTRACT

A storage compartment system for a vehicle includes a lid, and a snap rod locker including a first hinge portion. The first hinge portion includes a support portion connected to the lid and extends from a base portion to a rod portion. The storage compartment system further includes a bin having a second hinge portion having a locking feature and a plurality of arcuate flanges. The plurality of arcuate flanges defines an arcuate slot. The locking feature and the plurality of arcuate flanges define a gap in a hollow wall of the bin. The first hinge portion and the second hinge portion are connected to rotatably connect the lid to the bin.

17 Claims, 3 Drawing Sheets

SNAP ROD LOCKER

INTRODUCTION

The present disclosure relates to motor vehicles, and more specifically to storage within motor vehicles.

Motor vehicles are commonly equipped with storage compartments disposed in a variety of locations including, center consoles, armrests, door bins, sub-floor storage areas or under-seat storage areas, trunks, truck beds, and the like. The storage compartments are covered by lids. Storage compartment lids are often in hinged connection with storage compartment bins. Conventional storage compartment designs utilize a variety of different hinge lid hinge designs. However, under some common conditions, such as sudden acceleration or deceleration, the application of torque, and the like, conventional hinge designs may detach, separate, or otherwise fail. Accordingly, while conventional hinge designs for storage compartment lids operate for their intended purpose, production, assembly, and retention of the lid to the bin can be compromised under some conditions. Therefore, there is a need in the art for new and improved storage compartment hinged lid design that provides a robust, resilient, low-cost, hinge that has relatively simple construction, is easily assembled, and provides improved retention of the lid to the bin.

SUMMARY

In one aspect of the present disclosure, a storage compartment system for a vehicle includes a lid, and a snap rod locker including a first hinge portion. The first hinge portion includes a support portion connected to the lid and extends from a base portion to a rod portion. The storage compartment system further includes a bin having a second hinge portion having a locking feature and a plurality of arcuate flanges. The plurality of arcuate flanges defines an arcuate slot. The locking feature and the plurality of arcuate flanges define a gap in a hollow wall of the bin. The first hinge portion and the second hinge portion are connected to rotatably connect the lid to the bin.

In another aspect of the present disclosure, the base portion is a substantially planar plate having a plurality of attachment features affixing the base portion to the lid.

In yet another aspect of the present disclosure, the support portion is formed of a material having predetermined structural characteristics including tensile strength and modulus, creep and fatigue resistance, density, shrinkage, elasticity, thermal characteristics, and noise, vibration and harshness (NVH) characteristics.

In yet another aspect of the present disclosure the support portion extends substantially perpendicularly to the base portion.

In yet another aspect of the present disclosure the rod portion extends substantially perpendicularly to the support portion, and wherein the rod portion extends substantially parallel to an edge of the lid.

In yet another aspect of the present disclosure the locking feature further includes a free-standing tab defined by a plurality of slots formed in an interior portion of the hollow wall.

In yet another aspect of the present disclosure the rod portion is hollow, substantially cylindrical and extends from a first end to a second end.

In yet another aspect of the present disclosure the rod portion has a minor diameter at one or more of the first end and the second end. The rod portion has a major diameter disposed between the first end and the second end, and wherein the major diameter is larger than the minor diameter.

In yet another aspect of the present disclosure the second hinge portion further includes a plurality of arcuate tabs. The plurality of arcuate tabs define arc segments of a cylinder having a first diameter larger than the major diameter and the minor diameter of the rod portion, and wherein the gap extends for a distance smaller than either the major diameter or the minor diameter of the rod portion.

In yet another aspect of the present disclosure the plurality of arcuate flanges extend from an exterior portion of the hollow wall towards the interior portion of the hollow wall, and wherein the arcuate flanges define arc segments of a cylinder having second diameter larger than the major diameter and the minor diameter of the rod portion and smaller than first diameter of the arc segments defined by the arcuate tabs.

In yet another aspect of the present disclosure the first hinge portion is assembled with the second hinge portion. The support portion slidably engages with the arcuate slot. The rod portion slidably and rotatably engages with the plurality of arcuate flanges, and the plurality of arcuate tabs slidably engages with the plurality of arcuate flanges. The rod portion is retained within the hollow wall by a snap fit engagement with the locking feature and the plurality of arcuate flanges.

In yet another aspect of the present disclosure the first hinge portion is formed in a side-by-side molding process, and the second hinge portion is injection molded unitarily as a part of the bin. The storage compartment system is disposed within the vehicle in a location comprising one or more of a center console, an armrest, a door bin, a sub-floor storage area, an under-seat storage area, a trunk, or a truck bed.

In yet another aspect of the present disclosure a storage compartment assembly for a vehicle includes a lid and a snap rod locker. The snap rod locker includes a first hinge portion having a support portion connected to the lid and extending from a base portion to a rod portion. The storage compartment assembly further includes a bin having a second hinge portion. The second hinge portion includes a locking feature and a plurality of arcuate flanges, the plurality of arcuate flanges defining an arcuate slot, and the locking feature and the plurality of arcuate flanges defining a gap in a hollow wall of the bin. The support portion extends substantially perpendicularly to the base portion. The rod portion extends substantially perpendicularly to the support portion, and the rod portion extends substantially parallel to an edge of the lid. The storage compartment assembly is disposed within the vehicle in a location comprising one or more of a center console, an armrest, a door bin, a sub-floor storage area, an under-seat storage area, a trunk, or a truck bed.

In yet another aspect of the present disclosure the locking feature further includes a free-standing tab defined by a plurality of slots formed in an interior portion of the hollow wall.

In yet another aspect of the present disclosure the rod portion is hollow, substantially cylindrical and extends from a first end to a second end. The rod portion has a minor diameter at one or more of the first end and the second end. The rod portion has a major diameter disposed between the first end and the second end, and the major diameter is larger than the minor diameter.

In yet another aspect of the present disclosure the rod portion further includes a plurality of arcuate tabs supported by gussets. The plurality of arcuate tabs define arc segments of a cylinder having a diameter larger than the major diameter and the minor diameter of the rod portion. The gap extends for a distance smaller than either the major or the minor diameter of the rod portion.

In yet another aspect of the present disclosure the plurality of arcuate flanges extend from an exterior portion of the hollow wall towards an interior portion of the hollow wall. The arcuate flanges define arc segments of a cylinder having a diameter larger than the major diameter and the minor diameter of the rod portion and smaller than the arc segments defined by the arcuate tabs.

In yet another aspect of the present disclosure the first hinge portion is assembled with the second hinge portion. The support portion slidably engages with the arcuate slot, the rod portion slidably and rotatably engages with the plurality of arcuate flanges. The plurality of arcuate tabs slidably engages with the plurality of arcuate flanges, and the rod portion is retained within the hollow wall by a snap fit engagement with the locking feature and the arcuate flanges.

In yet another aspect of the present disclosure the first hinge portion is formed in a side-by-side molding process, and the second hinge portion is injection molded unitarily as a part of the bin. The support portion is formed of a material having predetermined structural characteristics comprising tensile strength and modulus, creep and fatigue resistance, density, elasticity, shrinkage, thermal characteristics, and noise, vibration and harshness (NVH) characteristics.

In yet another aspect of the present disclosure a storage compartment assembly for a vehicle includes a lid and a snap rod locker including a first hinge portion comprising a support portion connected to the lid and extending from a base portion to a rod portion. The storage compartment assembly further includes a bin having a second hinge portion including a locking feature and a plurality of arcuate flanges. The plurality of arcuate flanges define an arcuate slot, and the locking feature and the plurality of arcuate flanges define a gap in a hollow wall of the bin. The first hinge portion and the second hinge portion are connected to rotatably connect the lid to the bin. The support portion extends substantially perpendicularly to the base portion. The rod portion extends substantially perpendicularly to the support portion. The rod portion extends substantially parallel to an edge of the lid. The first hinge portion is assembled with the second hinge portion. The support portion slidably engages with the arcuate slot. The rod portion slidably and rotatably engages with the plurality of arcuate flanges. A plurality of arcuate tabs extends from the support portion and slidably engage with the plurality of arcuate flanges. The rod portion is retained within the hollow wall by a snap fit engagement with the locking feature and the arcuate flanges. The storage compartment assembly is disposed within the vehicle in a location including one or more of a center console, an armrest, a door bin, a sub-floor storage area, an under-seat storage area, a trunk, or a truck bed.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
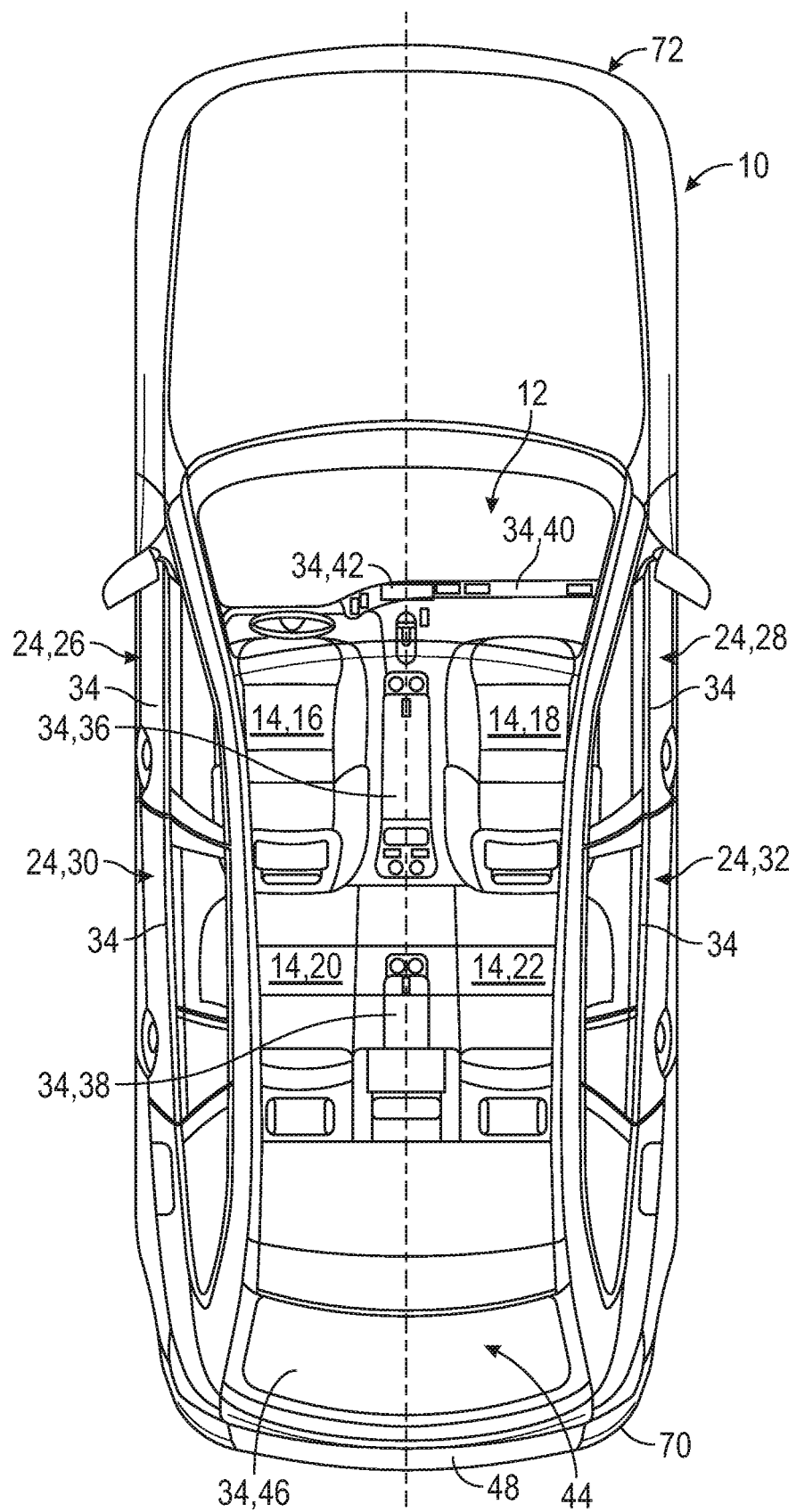
FIG. 1 is an environmental view of a motor vehicle having storage compartments with a hinge having a snap rod locker according to an aspect of the present disclosure.

Referring now to FIG. 1 a motor vehicle is shown and generally indicated by reference number 10. While the motor vehicle is illustrated as a car, it should be appreciated that the motor vehicle 10 may be any type of vehicle including a car, a van, a truck, a bus a motor home, an aircraft, a spacecraft, a water craft, or any other such vehicle without departing from the scope or intent of the present disclosure. The motor vehicle 10 includes a passenger compartment 12 having a plurality of seats 14 including a driver seat 16, a passenger seat 18, a left rear seat 20, and a right rear seat 22. The motor vehicle 10 also includes a plurality of doors 24. The driver seat 16 is positioned proximate a driver door 26, and the passenger seat 18 is positioned proximate a passenger door 28. In some examples, the left rear seat 20 is positioned proximate left rear door 30 and the right rear seat 22 is positioned proximate a right rear door 32. It should be appreciated, that depending on the particular motor vehicle 10, each of the plurality of seats 14 may be placed proximate at least one of the plurality of doors 24. However, it should be appreciated that depending on the type and construction of a given motor vehicle 10, the quantity of doors 24 and the quantity of seats 14 proximate the doors 24.

In several aspects, the motor vehicle 10 is equipped with a plurality of storage compartments 34. The storage compartments 34 of some examples are disposed within the passenger compartment 12 as a part of a front armrest 36 and/or a rear armrest 38 within a center console, an armrest, or a door bin. Additional storage compartments 34 include a glovebox 40 and/or a dash-top compartment 42. In some examples, a cargo area 44 of the motor vehicle 10 is equipped with a sub-floor storage area cargo compartment 46 or an under-seat storage area (not specifically shown). While in the example of FIG. 1, the motor vehicle 10 shown is an SUV, it should be appreciated that the cargo compartment 46 may be disposed in a bed of a truck, a trunk 48 of a car or SUV, or the like.

Each of the cargo compartments 46 of the motor vehicle 10 is composed of two primary components, namely a lid 50 and a bin 52. Depending on the application and/or the location of the cargo compartment 46 within the motor vehicle 10, the structures and shapes of the lid 50 and the bin 52 may vary substantially. In general, however, it should be appreciated that the lid 50 is shaped and sized to engage with and substantially enclose a volume "V" defined by the bin 52.

Figures 2A, 2B:
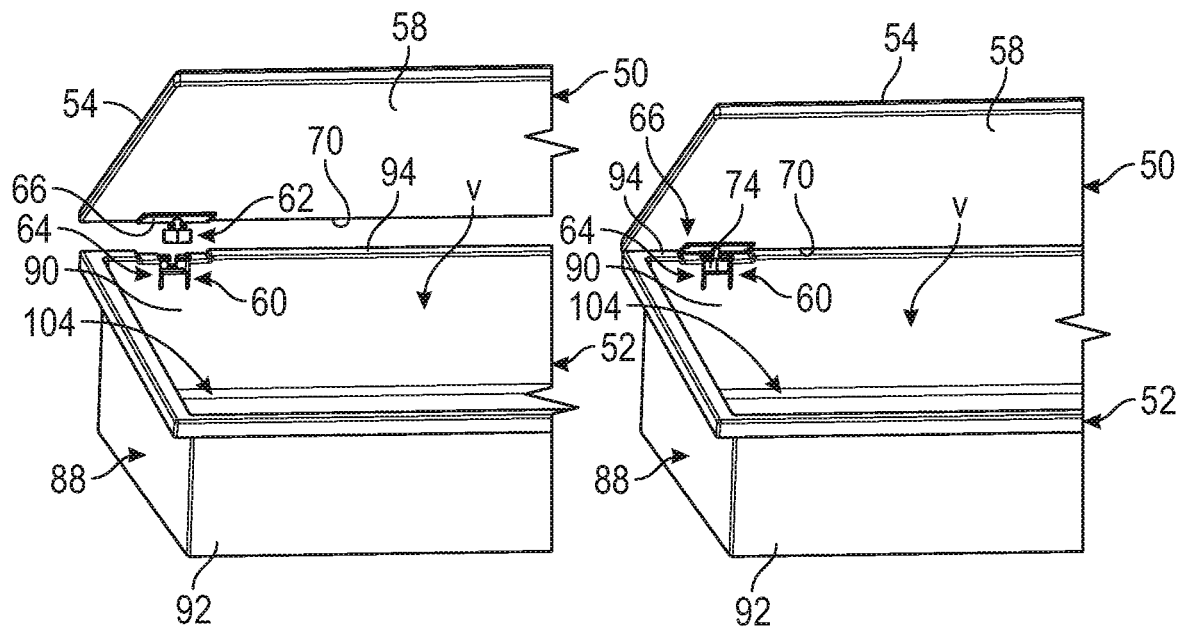
FIG. 2A is a perspective front view of a portion of a storage compartment with a hinge having a snap rod locker in an unassembled position according to an aspect of the present disclosure.
FIG. 2B is a perspective front view of a portion of a storage compartment with a hinge having a snap rod locker in an assembled position according to an aspect of the present disclosure.
Figure 3:
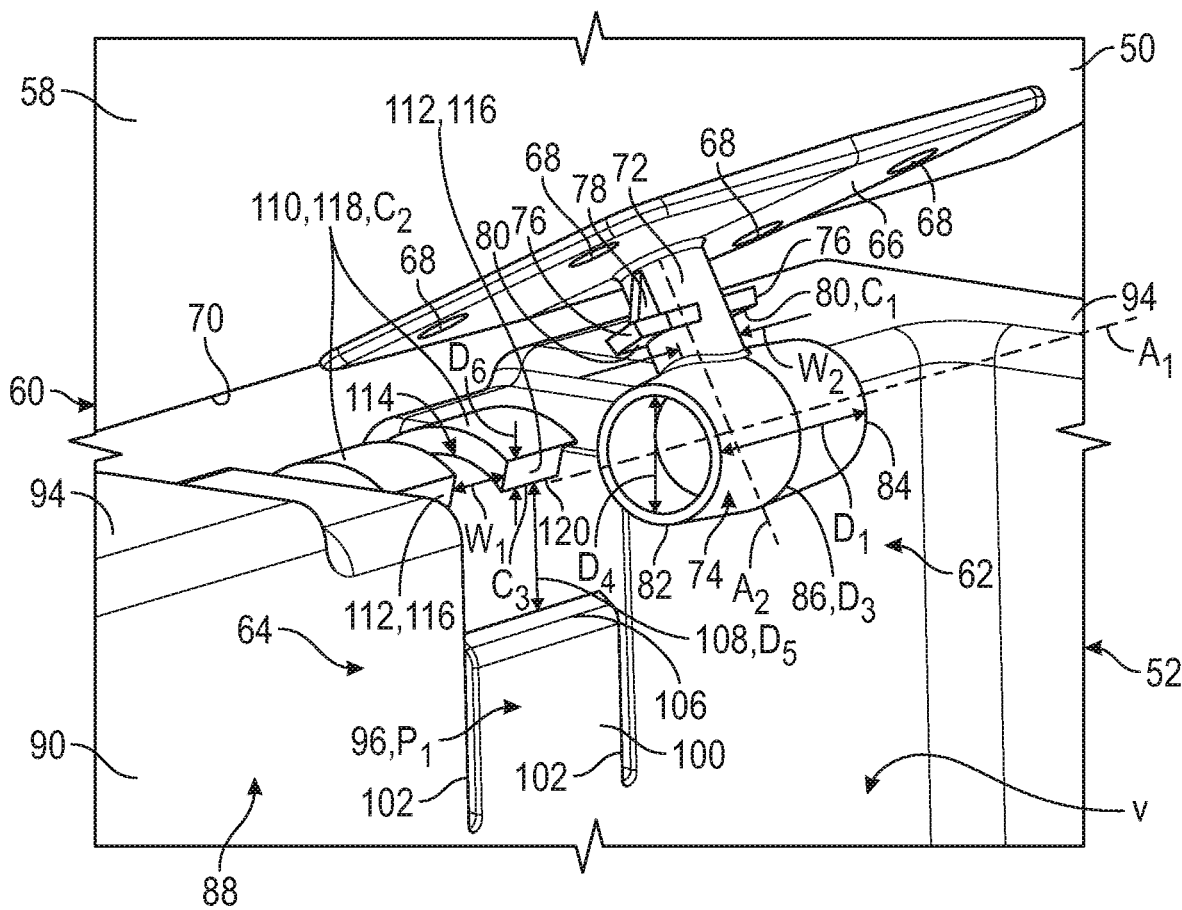
FIG. 3 is an enlarged perspective three-quarter view of a portion of a storage compartment with a hinge having a snap rod locker in an unassembled position according to an aspect of the present disclosure.

In the example of FIGS. 2 and 3, the cargo compartment 46 is disposed in the trunk 48 of the motor vehicle 10. More specifically, the lid 50 of the cargo compartment 46 has a substantially planar upper surface 54 forming at least a portion of a floor (not specifically shown) of the trunk 48 of the motor vehicle 10. In some instances, the lid 50 is disposed beneath a layer of insulating material such as a trunk liner, carpet, or the like (not specifically shown). The lid 50 also has a substantially planar lower surface 58 disposed opposite the upper surface 54. The lid 50 is rotatably attached to the bin 52 by one or more hinges or snap rod lockers 60. Each of the one or more snap rod lockers 60 include a first hinge portion 62 and a second hinge portion 64. In several aspects, the first hinge portion 62 protrudes from the lid 50. The second hinge portion 64 is formed in the bin 52 and is sized and shaped to accept the first hinge portion 62.

More specifically, the first hinge portion 62 includes a base portion 66. In some examples, the base portion 66 is formed as part of the lid 50. In other examples, the base portion 66 is formed as a separate component from the lid 50 and is shaped and sized to fit substantially flush against the lid 50. The base portion 66 may be formed of materials similar to or substantially different from the materials from which the lid 50 and/or bin 52 are made. In some examples, the lid 50, bin 52, and the first and second hinge portions 62, 64 are formed of polypropylene having predetermined structural characteristics such as tensile strength and elasticity. However, it should be appreciated that the base portion 66 may be formed of metal, plastic, composite, or other such materials, or any combination thereof without departing from the scope or intent of the present disclosure. In some examples, the base portion 66 is a substantially planar plate. The base portion 66 is attached to the lid 50 via one or more attachment features 68. The attachment features 68 may be any of a wide variety of known means of attachment, such as bolts, nuts, rivets, rivnuts, press-fit attachments, and/or adhesives, welding, braising, or the like, without departing from the scope or intent of the present disclosure. The base portion 66 in FIGS. 2 and 3 is attached by one or more attachment features 68 to the substantially planar lower surface 58 of the lid 50. It should be appreciated that depending on the particular application, the base portion 66 may be located in other positions relative to the lid 50. In one example, the base portion 66 is located at a periphery or edge 70 of the lid 50.

A support portion 72 extends for a first distance $D_1$ from the base portion 66 to a substantially cylindrical rod portion 74. The support portion 72 is shown in FIGS. 2A-3C as being substantially cylindrical, however, it should be appreciated that the precise cross-sectional shape of the support portion 72 may vary. That is, the support portion 72 may have a cylindrical, ovoid, square, rectangular, or other such cross-sectional shape without departing from the scope or intent of the present disclosure. In some examples, the support portion 72 is formed unitarily with one or more of the base portion 66 and the cylindrical rod portion 74. The support portion 72 is a structural component connecting the base portion 66 to the substantially cylindrical rod portion 74. The structural characteristics, such as tensile strength and modulus, creep and fatigue resistance, density, elasticity, shrinkage, thermal characteristics and the like of the support portion 72 are selected to provide predetermined operational longevity, low noise, vibration and harshness (NVH) characteristics (such as resistance to vibration, squeaking, rattling or the like), and so forth. Accordingly, the structural characteristics for a given application of the snap rod locker 60 are predetermined based on the needs of the application.

One or more arcuate tabs 76 are formed on the support portion 72 between the base portion 66 and the cylindrical rod portion 74. The arcuate tabs 76 extend substantially perpendicularly from the support portion 72. One or more gussets 78 connect the arcuate tabs 76 to the support portion 72. The gussets 78 reinforce, support, and locate the arcuate tabs 76 relative to the support portion 72. Moreover, the gussets 78 substantially prevent deflection or movement of the arcuate tabs 76 relative to the support portion 72. In several aspects, the arcuate tabs 76 have an inward-facing surface 80 that is proximate to and faces the substantially cylindrical rod portion 74. Moreover, the inward-facing surface 80 forms a first arc $C_1$ that describes a portion of a cylinder concentric with and having a larger diameter than the substantially cylindrical rod portion 74.

A first axis $A_1$ of the substantially cylindrical rod portion 74 is perpendicular to a second axis $A_2$ of the support portion 72. Likewise, the second axis $A_2$ of the support portion 72 is substantially perpendicular to the base portion 66. Thus, the first axis $A_1$ is substantially parallel to the base portion 66. Depending on the configuration of the cargo compartment 46, the first axis $A_1$ is substantially parallel to the periphery or edge 70 of the lid 50. The substantially cylindrical rod portion 74 extends for a second distance $D_1$ from a first end 82 to a second end 84. Each of the first and second ends 82, 84 are open and free of material. That is, the substantially cylindrical rod portion 74 is at least partially hollow. At approximately a halfway point 86 between the first and second ends 82, 84, the cylindrical rod portion 74 has a major diameter $D_3$. Each of the first and second ends 82, 84, has a minor diameter $D_4$. The major diameter $D_3$ is greater than the minor diameter $D_4$. Accordingly, the substantially cylindrical rod portion 74 tapers slightly from the halfway point 86 towards each of the first and second ends 82, 84. In several aspects, the first hinge portion 62 is formed in a side-by-side injection molding process. For the halves of the mold used in the side-by-side molding process to separate and leave a properly-formed injection-molded part, the halves of the mold include a tapering shape which forms the major and minor diameters $D_3$, $D_4$ of the substantially cylindrical rod portion 74. Other molding methodologies may be used to form the first hinge portion 62, without departing from the scope or intent of the present disclosure. Accordingly, the taper from the halfway point 86 to each of the first and second ends 82, 84 is primarily dependent on the technology of the manufacturing process. In some instances, the major and minor diameters $D_3$, $D_4$ may even be equal to one another.

In several aspects, the bin 52 has a plurality of hollow walls 88. The volume V is bounded or defined by interior portions 90 of the hollow walls 88. The interior portions 90 are connected to exterior portions 92 of the hollow walls 88 by the rim 94 of the bin 52. Thus, a cross-section of a hollow wall 88 approximates an inverted and somewhat squared-off U-shape. However, it should be appreciated that other cross-sectional shapes of the hollow walls 88 of the bin 52 may be used for certain applications and are therefore contemplated herein.

As mentioned previously, the second hinge portion 64 is formed in the bin 52 and is sized and shaped to accept the first hinge portion 62. More specifically, the second hinge portion 64 is formed in the hollow wall 88 of the bin 52 proximate to and including a portion of the rim 94 of the bin 52. The second hinge portion 64 includes a locking feature 96 formed in the interior portion 90 of the hollow wall 88. The locking feature 96 is formed as a free-standing tab 100 formed by a plurality of slots 102 inscribed through the interior portion 90 of the wall. The locking feature 96 extends upward relative to a bottom 104 of the hollow wall 88 of the bin 52. More specifically, the locking feature 96 extends upward to and defines a lower border 106 of a gap 108 in the hollow wall 88 of the bin 52. The plurality of slots 102 partially separate the locking feature 96 from the rest of the interior portion 90 of the hollow wall 88. Accordingly, in an example, the locking feature 96 forms a tab in the interior portion 90 of the hollow wall 88. In several aspects, because the locking feature 96 is free-standing relative to the rest of the interior portion 90 of the hollow wall 88, the locking feature 96 can be deflected relative to the rest of the interior portion 90 of the hollow wall 88 upon the application of force in a direction substantially perpendicular to the interior portion 90 of the hollow wall 88. The locking feature 96 has been shown as being only a single tab in the figures, however it should be appreciated that depending on the materials used to form the bin 52, the structural rigidity of the interior portion 90 of the hollow wall 88 may necessitate the use of multiple locking features 96 instead. That is, in some examples, the plurality of slots 102 may form two or more locking features 96 without departing from the scope or intent of the present disclosure.

The second hinge portion 64 also includes a plurality of arcuate flanges 110 formed as a part of both the exterior portion 92 and the rim 94 of the bin 52. The arcuate flanges 110 extend upward relative to the bottom 104 of the hollow wall 88 and curve inwards towards the interior portion 90 from the exterior portion 92. Inward-facing edges 112 of the arcuate flanges 110 are substantially parallel to one another and define an arcuate slot 114 having a first width $W_1$. In several aspects, the first width $W_1$ is substantially similar to, but slightly larger than a second width $W_2$ of the support portion 72. The arcuate flanges 110 also extend to and define an upper limit or border 116 of the gap 108 in the hollow wall 88 of the bin 52. In several aspects, the gap 108 between the lower border 106 and upper limit or border 116 extends for a distance $D_5$ slightly smaller than either or both of the major and minor diameters $D_3$, $D_4$ of the substantially cylindrical rod portion 74. The arcuate flanges 110 have an upper flange surface 118 and a lower flange surface 120. In several aspects, the upper flange surface 118 and the lower flange surface 120 are displaced from one another by a second distance $D_6$ substantially equivalent to the material thickness of the exterior portion 92 of the hollow wall 88. The upper flange surface 118 forms a second arc $C_2$ and the lower flange surface 120 forms a third arc $C_3$, such that each of the second and third arcs $C_2$, $C_3$ describe a portion of a cylinder that is concentric with and has a larger diameter than the substantially cylindrical rod portion 74. In several aspects, the first arc $C_1$ has a larger diameter than the second arc $C_2$, and the second arc $C_2$ has a larger diameter than the third arc $C_3$.

Figure 4A:
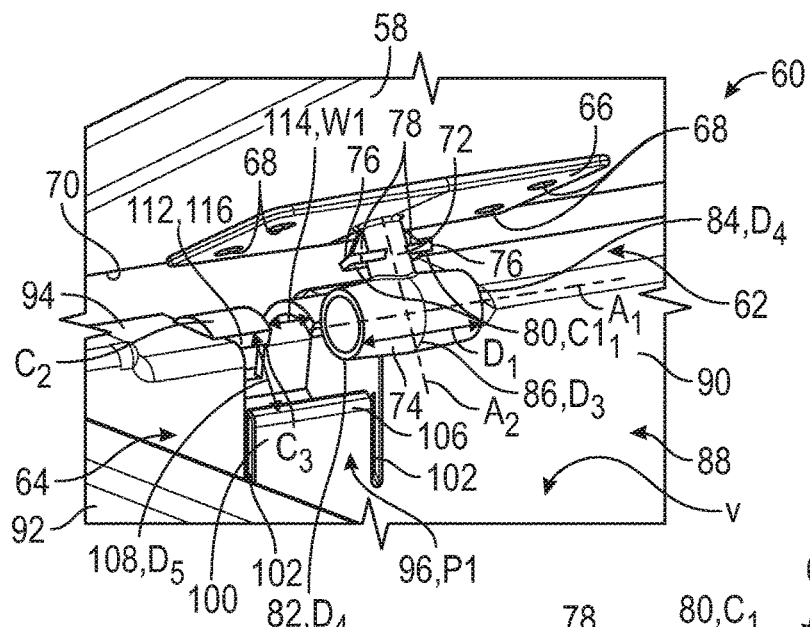
FIG. 4A is an enlarged perspective front view of a portion of a storage compartment with a hinge having a snap rod locker in an unassembled position according to an aspect of the present disclosure.
Figure 4B:
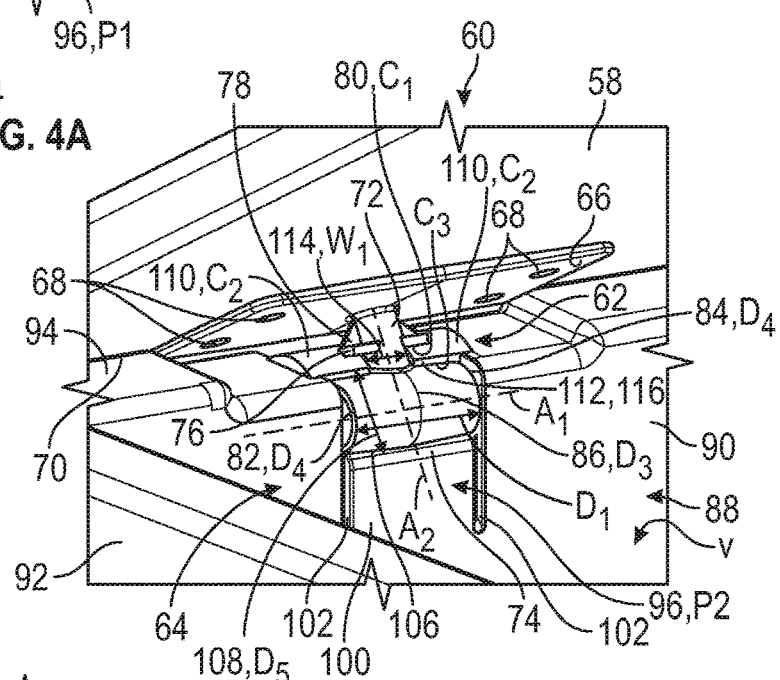
FIG. 4B is an enlarged perspective front view of a portion of a storage compartment with a hinge having a snap rod locker in a partially assembled position according to an aspect of the present disclosure.
Figure 4C:
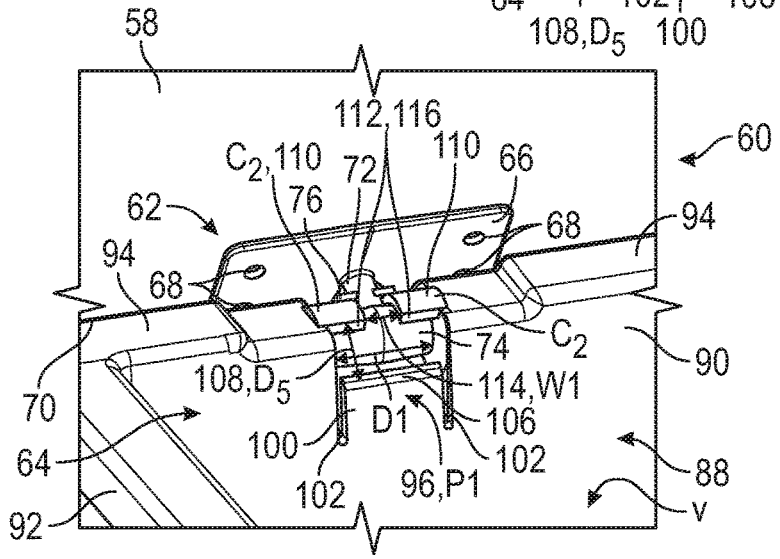
FIG. 4C is an enlarged perspective front view of a portion of a storage compartment with a hinge having a snap rod locker in an assembled position according to an aspect of the present disclosure.

Turning now to FIGS. 4A-4C a progression of assembly positions for the first hinge portion 62 and the second hinge portion 64 is shown. During assembly, the first hinge portion 62 is assembled with or formed as a part of the lid 50. The first hinge portion 62 is then assembled with the second hinge portion 64 in rotatable press-fit engagement. That is, the support portion 72 is inserted into the arcuate slot 114 in an assembly position, such that the lid 50 is at a predetermined assembly angle α relative to the bin 52. The substantially cylindrical rod portion 74 is contemporaneously inserted into the gap 108. Because the gap 108 between the lower border 106 and upper limit or border 116 extends for the distance $D_5$ slightly smaller than either or both of the major and minor diameters $D_3$, $D_4$ of the substantially cylindrical rod portion 74 the substantially cylindrical rod portion 74 is at least partially prevented from entering and engaging with the second hinge portion 64 by the locking feature 96. However, when the substantially cylindrical rod portion 74 is pressed with a predetermined quantity of force against the free-standing locking feature 96, locking feature 96 deflects from a first position $P_1$ substantially parallel to the rest of the interior portion 90 of the hollow wall 88 to a second position $P_2$ (shown in FIG. 4B) displaced inwards from the interior portion 90 of the hollow wall 88. In the second position, the gap 108 between the lower border 106 and the upper limit or border 116 is larger than when the locking feature 96 is in the first position $P_1$. More specifically, when the locking feature 96 is deflected to the second position, the gap 108 expands such that the distance $D_5$ is larger than both of the major and minor diameters $D_3$, $D_4$ thereby allowing the substantially cylindrical rod portion 74 to pass through the gap 108 and enter the hollow wall 88.

As the substantially cylindrical rod portion 74 passes through the gap 108, the arcuate tabs 76 engage with and contact the arcuate flanges 110. More specifically, the inward-facing surfaces 80 of each of the arcuate flanges 110 contact and engage in sliding communication with the upper flange surface 118. Likewise, the lower flange surface 120 of each of the arcuate flanges 110 contacts and engages in sliding communication with the substantially cylindrical rod portion 74. Accordingly, when the first hinge portion 62 enters and rotatably and/or slidably engages with the second hinge portion 64, the arcuate flanges 110 extend between and are captured in sliding engagement with the arcuate tabs 76 and the substantially cylindrical rod portion 74. Likewise, the substantially cylindrical rod portion 74 is captured behind the locking feature 96 relative to the interior portion 90 of the hollow wall 88. Once the substantially cylindrical rod portion 74 is retained within the hollow wall 88 behind the locking feature 96, and the support portion 72 is retained between the arcuate flanges 110, assembly of the first and second hinge portions 62, 64 is completed by rotating the lid 50 from the assembly angle α to a closed position where the lid 50 is flush with the rim 94 of the bin 52.

Once the first and second hinge portions 62, 64 are assembled with each other, the first hinge portion 62 is retained within the second hinge portion 64 by the locking feature 96. As mentioned before, the locking feature 96 is deflectable in response to a predetermined amount of force substantially perpendicular to the interior portion 90 of the hollow wall 88. Accordingly, once the first and second hinge portions 62, 64 are assembled with one another, the first hinge portion 62 is retained within the second hinge portion 64 up to at least the predetermined amount of force by the locking feature 96. As a result, the first hinge portion 62 resists removal from the second hinge portion 64 up to approximately the predetermined amount of force. By resisting removal of the first hinge portion 62 from the second hinge portion 64, the snap rod locker of the present disclosure resists some or all of the effects of sudden accelerative or decelerative forces. That is, the snap rod locker 60 connects the lid 50 to the bin 52 of the storage compartment 34, and resists removal of the lid 50 from the bin 52 up to at least the predetermined amount of force.

Furthermore, once the first hinge portion 62 is installed and retained within the second hinge portion 64 of the snap rod locker 60, the lid 50 is rotatably moved relative to the bin 52 about the first axis $A_1$. However, rotatable movement of the lid 50 is limited by a depth (not specifically shown) of the arcuate slot 114. That is, the arcuate slot 114 extends from the upper limit or border 116 of the gap 108 towards the exterior portion 92 of the hollow wall 88 and terminates at an end (not shown) formed in the exterior portion 92 of the hollow wall 88. In several aspects, a position of the end of the arcuate slot 114 defines an arc distance through which the support portion 72 can travel. In other words, the end of the arcuate slot 114 defines a rotational limit for how far the first hinge portion 62 can travel relative to the second hinge portion 64. Therefore, the end of the arcuate slot 114 defines a rotational limit for how far the lid 50 can rotate relative to the bin 52 from a closed position (not specifically shown) to a fully open position (not specifically shown).

A snap rod locker 60 of the present disclosure offers several advantages. These include increasing structural strength, rigidity, and the like as well as reduced potential for squeaks, rattles, and other noise, vibration and harshness (NVH) characteristics for the first and second hinge portions 62, 64. Additionally, the snap rod locker 60 reduces an amount of assembly complexity and/or effort as well as simplifying an alignment process between the lid 50 and the bin 52. Moreover, the snap rod locker 60 can be produced with simplified production techniques having low cost. The snap rod locker 60 also prevents displacement of the lid 50 from the bin 52 during sudden acceleration or deceleration events, thereby decreasing a potential for unintentional detachment or breakage of the one or more hinges or snap rod lockers 60.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A storage compartment system for a vehicle comprising:
    a lid;
    a snap rod locker including a first hinge portion comprising a support portion connected to the lid and extending from a base portion to a rod portion; and
    a bin having a second hinge portion comprising a locking feature and a plurality of arcuate flanges, the plurality of arcuate flanges defining an arcuate slot, and the locking feature and the plurality of arcuate flanges defining a gap in a hollow wall of the bin,
    wherein the first hinge portion and the second hinge portion are connected to rotatably connect the lid to the bin; and
    wherein the locking feature further comprises a freestanding tab defined by a plurality of slots formed in an interior portion of the hollow wall.

2. The storage compartment system of claim 1 wherein the base portion is a substantially planar plate having a plurality of attachment features affixing the base portion to the lid.

3. The storage compartment system of claim 1 the support portion extends substantially perpendicularly to the base portion.

4. The storage compartment system of claim 1 wherein the rod portion extends substantially perpendicularly to the support portion, and wherein the rod portion extends substantially parallel to an edge of the lid.

5. The storage compartment system of claim 1 wherein the rod portion is hollow, substantially cylindrical and extends from a first end to a second end.

6. The storage compartment system of claim 5 wherein the rod portion has a minor diameter at one or more of the first end and the second end, the rod portion has a major diameter disposed between the first end and the second end, and wherein the major diameter is larger than the minor diameter.

7. The storage compartment system of claim 6 wherein the second hinge portion further comprises a plurality of arcuate tabs, wherein the plurality of arcuate tabs define arc segments of a first cylinder having a first diameter larger than the major diameter and the minor diameter of the rod portion, and wherein the gap extends for a distance smaller than either the major diameter or the minor diameter of the rod portion.

8. The storage compartment system of claim 7, wherein the plurality of arcuate flanges extend from an exterior portion of the hollow wall towards an interior portion of the hollow wall, and wherein the arcuate flanges define arc segments of a second cylinder having a second diameter larger than the major diameter and the minor diameter of the rod portion and smaller than first diameter of the arc segments defined by the arcuate tabs.

9. The storage compartment system of claim 8 wherein the first hinge portion is assembled with the second hinge portion, the support portion slidably engages with the arcuate slot, the rod portion slidably and rotatably engages with the plurality of arcuate flanges, and the plurality of arcuate tabs slidably engages with the plurality of arcuate flanges, and wherein the rod portion is retained within the hollow wall by a snap fit engagement with the locking feature and the plurality of arcuate flanges.

10. The storage compartment system of claim 1 wherein the first hinge portion is formed in a side-by-side molding process, and the second hinge portion is injection molded unitarily as a part of the bin, and wherein the storage compartment system is disposed within the vehicle in a location comprising a trunk.

11. A storage compartment assembly for a vehicle comprising:
    a lid;
    a snap rod locker including a first hinge portion comprising a support portion connected to the lid and extending from a base portion to a rod portion; and
    a bin having a second hinge portion comprising a locking feature and a plurality of arcuate flanges, the plurality of arcuate flanges defining an arcuate slot, and the locking feature and the plurality of arcuate flanges defining a gap in a hollow wall of the bin,
    wherein the support portion extends substantially perpendicularly to the base portion, the rod portion extends substantially perpendicularly to the support portion, and the rod portion extends substantially parallel to an edge of the lid, wherein the storage compartment assembly is disposed within the vehicle in a location comprising a trunk, and wherein the locking feature further comprises a freestanding tab defined by a plurality of slots formed in an interior portion of the hollow wall.

12. The storage compartment assembly of claim 11, wherein the rod portion is hollow, substantially cylindrical and extends from a first end to a second end, the rod portion has a minor diameter at one or more of the first end and the second end, the rod portion has a major diameter disposed between the first end and the second end, and wherein the major diameter is larger than the minor diameter.

13. The storage compartment assembly of claim 12, wherein the rod portion further comprises a plurality of arcuate tabs supported by gussets, wherein the plurality of arcuate tabs define arc segments of a cylinder having a diameter larger than the major diameter and the minor diameter of the rod portion, and wherein the gap extends for a distance smaller than either the major or the minor diameter of the rod portion.

14. The storage compartment assembly of claim 13, wherein the plurality of arcuate flanges extend from an exterior portion of the hollow wall towards an interior portion of the hollow wall, and wherein the arcuate flanges define arc segments of a cylinder having a diameter larger than the major diameter and the minor diameter of the rod portion and smaller than the arc segments defined by the arcuate tabs.

15. The storage compartment assembly of claim 14 wherein the first hinge portion is assembled with the second hinge portion, the support portion slidably engages with the arcuate slot, the rod portion slidably and rotatably engages with the plurality of arcuate flanges, and the plurality of arcuate tabs slidably engages with the plurality of arcuate flanges, and wherein the rod portion is retained within the hollow wall by a snap fit engagement with the locking feature and the arcuate flanges.

16. The storage compartment assembly of claim 11 wherein the first hinge portion is formed in a side-by-side molding process, and the second hinge portion is injection molded unitarily as a part of the bin.

17. A storage compartment assembly for a vehicle comprising:
- a lid;
- a snap rod locker including a first hinge portion comprising a support portion connected to the lid and extending from a base portion to a rod portion; and
- a bin having a second hinge portion comprising a locking feature and a plurality of arcuate flanges, the plurality of arcuate flanges defining an arcuate slot, and the locking feature and the plurality of arcuate flanges defining a gap in a hollow wall of the bin,
- wherein the first hinge portion and the second hinge portion are connected to rotatably connect the lid to the bin, the support portion extends substantially perpendicularly to the base portion, the rod portion extends substantially perpendicularly to the support portion, and the rod portion extends substantially parallel to an edge of the lid, the first hinge portion is assembled with the second hinge portion, the support portion slidably engages with the arcuate slot, the rod portion slidably and rotatably engages with the plurality of arcuate flanges, and a plurality of arcuate tabs extend from the support portion and slidably engage with the plurality of arcuate flanges, and wherein the rod portion is retained within the hollow wall by a snap fit engagement with the locking feature and the arcuate flanges, and wherein the storage compartment assembly is disposed within the vehicle in a location comprising a trunk.

* * * * *